(12) United States Patent
Chae et al.

(10) Patent No.: US 11,380,952 B2
(45) Date of Patent: Jul. 5, 2022

(54) FLEXIBLE CLOSURE FOR ENERGY STORAGE DEVICE AND ENERGY STORAGE DEVICE INCLUDING THE SAME

(71) Applicant: Maxwell Technologies Korea Co., Ltd., Yongin-si (KR)

(72) Inventors: Jung-Hoon Chae, San Diego, CA (US); Na Ri Shin, Yongin-si (KR); Kyu Jeung Lee, Yongin-si (KR)

(73) Assignee: Maxwell Technologies Korea Co., Ltd., Yongin-si (KR)

( * ) Notice: Subject to any disclaimer, the term of this patent is extended or adjusted under 35 U.S.C. 154(b) by 24 days.

(21) Appl. No.: 16/981,488

(22) PCT Filed: Mar. 12, 2019

(86) PCT No.: PCT/US2019/021856
§ 371 (c)(1),
(2) Date: Sep. 16, 2020

(87) PCT Pub. No.: WO2019/190739
PCT Pub. Date: Oct. 3, 2019

(65) Prior Publication Data
US 2021/0028413 A1  Jan. 28, 2021

Related U.S. Application Data

(60) Provisional application No. 62/648,234, filed on Mar. 26, 2018.

(51) Int. Cl.
*H01M 50/116* (2021.01)
*H01M 50/543* (2021.01)
*H01M 50/155* (2021.01)

(52) U.S. Cl.
CPC ....... *H01M 50/116* (2021.01); *H01M 50/155* (2021.01); *H01M 50/543* (2021.01)

(58) Field of Classification Search
CPC . H01M 50/116; H01M 50/543; H01M 50/155
See application file for complete search history.

(56) References Cited

U.S. PATENT DOCUMENTS

| | | |
|---|---|---|
| 2007/0207379 A1 | 9/2007 | Hatta et al. |
| 2015/0188100 A1 | 7/2015 | Isozaki et al. |
| 2018/0102514 A1 | 4/2018 | Dai et al. |

FOREIGN PATENT DOCUMENTS

| | | | |
|---|---|---|---|
| EP | 3 249 715 A1 | 11/2017 | |
| GB | 397 750 A | 8/1933 | |

(Continued)

OTHER PUBLICATIONS

International Preliminary Report on Patentability dated Sep. 29, 2020 in International Application No. PCT/US2019/021856, in 8 pages.

(Continued)

*Primary Examiner* — Jane J Rhee
(74) *Attorney, Agent, or Firm* — Knobbe Martens Olson & Bear LLP (57) ABSTRACT

This application relates to an energy storage device. In one embodiment, the energy storage device includes an electrode unit including first and second current collectors that are separated by a separator, first and second terminals respectively connected to the first and second current collectors and a case accommodating the electrode unit. The energy storage device also includes a flexible closure covering the case and having first and second through-holes passing therethrough and exposing the first and second terminals to the environment, wherein the flexible closure contains about 15 wt % or less of $SiO_2$. According to some embodiments, since the weight percentage of $SiO_2$ is significantly reduced and thus, the amount and degree of the $SiO_2$ reduction significantly decreases, a structural deformation of the flexible closure at a microscopic level is mini- (Continued)

mized. Accordingly, a wetting phenomenon is significantly reduced, and thus the life span of an energy storage device significantly increases.

25 Claims, 5 Drawing Sheets

(56) References Cited

FOREIGN PATENT DOCUMENTS

| | | |
|---|---|---|
| JP | 2007-265989 A | 10/2007 |
| JP | 5169112 B2 | 3/2013 |
| JP | 2013-093182 A | 5/2013 |
| KR | 2017-0070339 A | 6/2017 |
| KR | 2018-0017014 A | 2/2018 |
| WO | WO 2007/06091 | 5/2007 |

OTHER PUBLICATIONS

International Search Report and Written Opinion dated May 28, 2019 in International Application No. PCT/US2019/021856, in 12 pages.

FLEXIBLE CLOSURE FOR ENERGY STORAGE DEVICE AND ENERGY STORAGE DEVICE INCLUDING THE SAME

INCORPORATION BY REFERENCE TO ANY PRIORITY APPLICATIONS

This application is a U.S. national phase application under 35 U.S.C. § 371 of International Application No. PCT/US2019/021856, filed on Mar. 12, 2019, which claims the benefit of U.S. Provisional Patent Application No. 62/648,234, filed Mar. 26, 2018, entitled "FLEXIBLE CLOSURE FOR ENERGY STORAGE DEVICE AND ENERGY STORAGE DEVICE INCLUDING THE SAME," the entire contents of each of which are incorporated herein by reference.

BACKGROUND

Field

The described technology generally relates to energy storage devices, and specifically to an energy storage device including a flexible closure having an increased life span.

Description of the Related Technology

Electrical energy storage cells are widely used to provide power to electronic, electromechanical, electrochemical, and other useful devices. Such cells include batteries such as primary chemical cells and secondary (rechargeable) cells, fuel cells, and various species of capacitors, including electric double-layer capacitors (EDLCs). An EDLC is electrically charged and discharged using electrodes that are electrically conductive. EDLCs are used in many different commercial applications ranging from portable consumer devices such as mobile phones, GPS receivers. MP3 players, and backup memory devices to industrial equipment or larger devices such as wind energy systems, solar energy systems, and motors of electric vehicles and hybrid electric vehicles.

SUMMARY

For purposes of summarizing the described technology and the advantages achieved over the prior art, certain objects and advantages of the described technology are described herein. Not all such objects or advantages may be achieved in any particular embodiment of the described technology. Thus, for example, those skilled in the art will recognize that the described technology may be embodied or carried out in a manner that achieves or optimizes one advantage or group of advantages as taught herein without necessarily achieving other objects or advantages as may be taught or suggested herein.

One inventive aspect is an energy storage device having a flexible closure with reduced amount of $SiO_2$.

Another aspect is an energy storage device having a flexible closure with reduced amount of ZnO.

Another aspect is an energy storage device. The energy storage device may include an electrode unit including first and second current collectors that are separated by a separator and first and second terminals respectively connected to the first and second current collectors. The energy storage device may also include a case accommodating the electrode unit and a flexible closure covering the case and having first and second through-holes passing therethrough and exposing the first and second terminals to the environment, wherein the flexible closure contains about 15 wt % or less of $SiO_2$.

Another aspect is a flexible closure for an energy storage device, wherein the flexible closure is configured to cover a case of an electrode unit of the energy storage device, and wherein the flexible closure has first and second through-holes passing therethrough and configured to expose first and second terminals of the energy storage device to the environment, and wherein the flexible closure contains about 15 wt % or less of $SiO_2$.

Another aspect is an energy storage device. The energy storage device may include an electrode unit including first and second current collectors that are separated by a separator and first and second terminals respectively connected to the first and second current collectors. The energy storage device may also include a case accommodating the electrode unit and a flexible closure covering the case and having first and second through-holes passing therethrough and exposing the first and second terminals to the environment. The flexible closure may contain about 15 wt % or less of $SiO_2$ and 1 wt % or less of ZnO, and wherein the flexible closure may further contain at least one of the following: polymer having a weight percentage greater than 35 wt %, carbon having a weight percentage greater than 13.5 wt %, $Al_2O_3$ having a weight percentage greater than 17 wt % and resin having a weight percentage greater than 4.5 wt %.

Another aspect is an energy storage device. The energy storage device may include an electrode unit including first and second current collectors that are separated by a separator, first and second terminals respectively connected to the first and second current collectors and a case accommodating the electrode unit. The energy storage device may also include a flexible closure covering the case and having first and second through-holes passing therethrough and exposing the first and second terminals to the environment, wherein the flexible closure contains $SiO_2$ in the range of being greater than 0 wt % and less than 28 wt %.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects.

DETAILED DESCRIPTION

Provided herein are various embodiments of energy storage devices having an increased life span. For example, in certain embodiments, energy storage devices disclosed herein include a flexible closure with reduced amount of $SiO_2$. Although the disclosed embodiments are described based on electric double layer devices, the described technology is not limited thereto, and can be applied to other energy storage devices discussed above.

Embodiments relate to significantly reducing a wetting phenomenon (i.e., longer wetting time) in an energy storage device by reducing the weight percentage (wt %) of $SiO_2$ in a flexible closure of the energy storage device (e.g., rubber closure). One embodiment is an energy storage device having a flexible closure that contains less than 28 wt % of $SiO_2$. The weight percentage of $SiO_2$ can be in a range of about 0 wt % to about 15 wt %, about 0 wt % to about 10 wt %, about 0 wt % to about 5 wt %, or about 0 wt % to about 1 wt %. In some embodiments, the wetting phenomenon starts to significantly improve at about 15 wt % of $SiO_2$, and at about 1 wt % of $SiO_2$, the wetting time becomes at least about six times longer than in a conventional energy storage device. For example, a conventional energy storage device whose rubber closure contains 28 wt % is significantly wet in about 500 hours, whereas energy storage devices according to embodiments may not be wet up to 2,000 hours at all and may be insignificantly wet in about 3,000 hours. The above wetting time has been measured under a simulated testing environment, for example, described below with respect to the experiments, instead of an actual operating environment where it may take several years to detect a wetting phenomenon.

Figure 1:
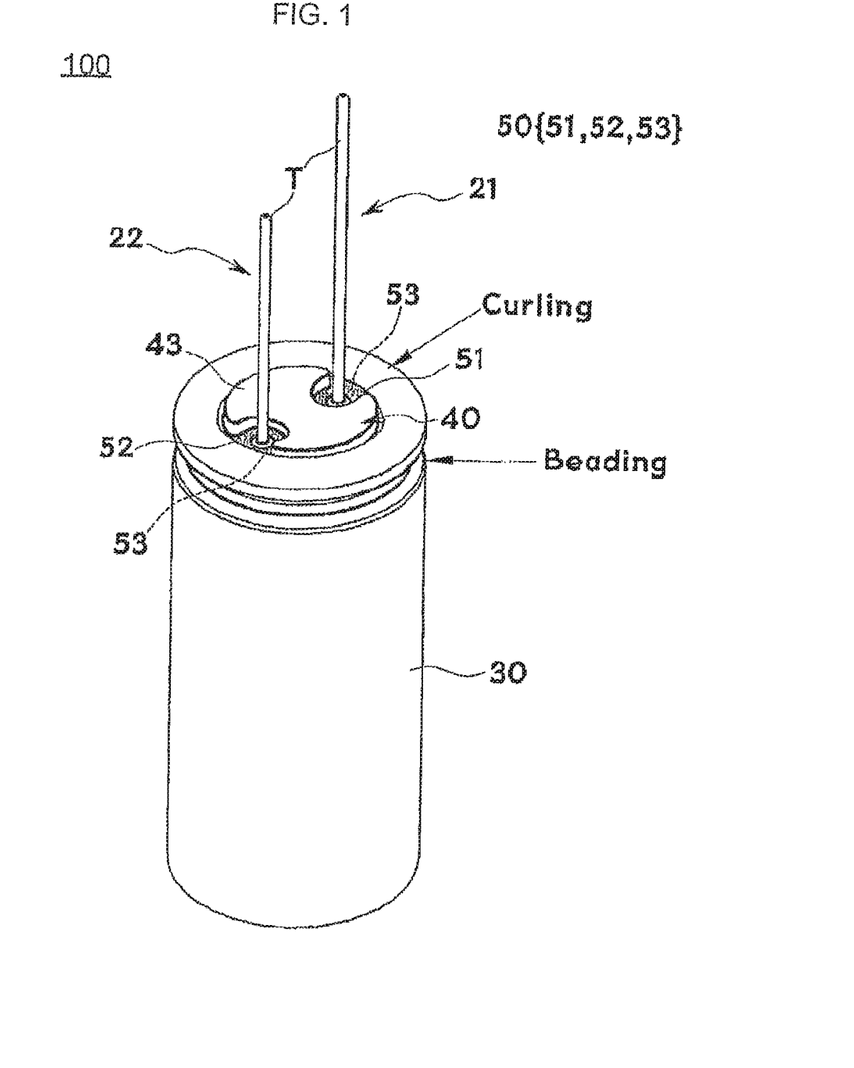
FIG. 1 depicts an energy storage device according an embodiment.
Figure 2A:
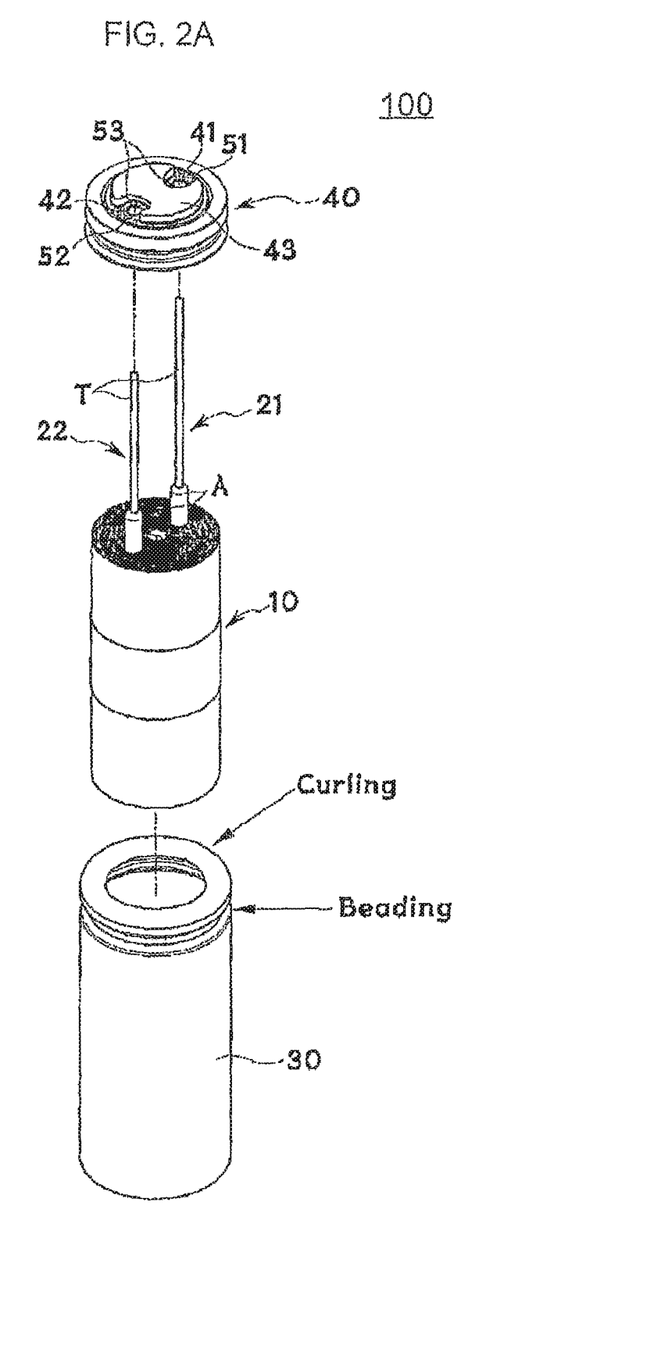
FIG. 2A is an exploded view of the energy storage device of FIG. 1.
Figure 2B:
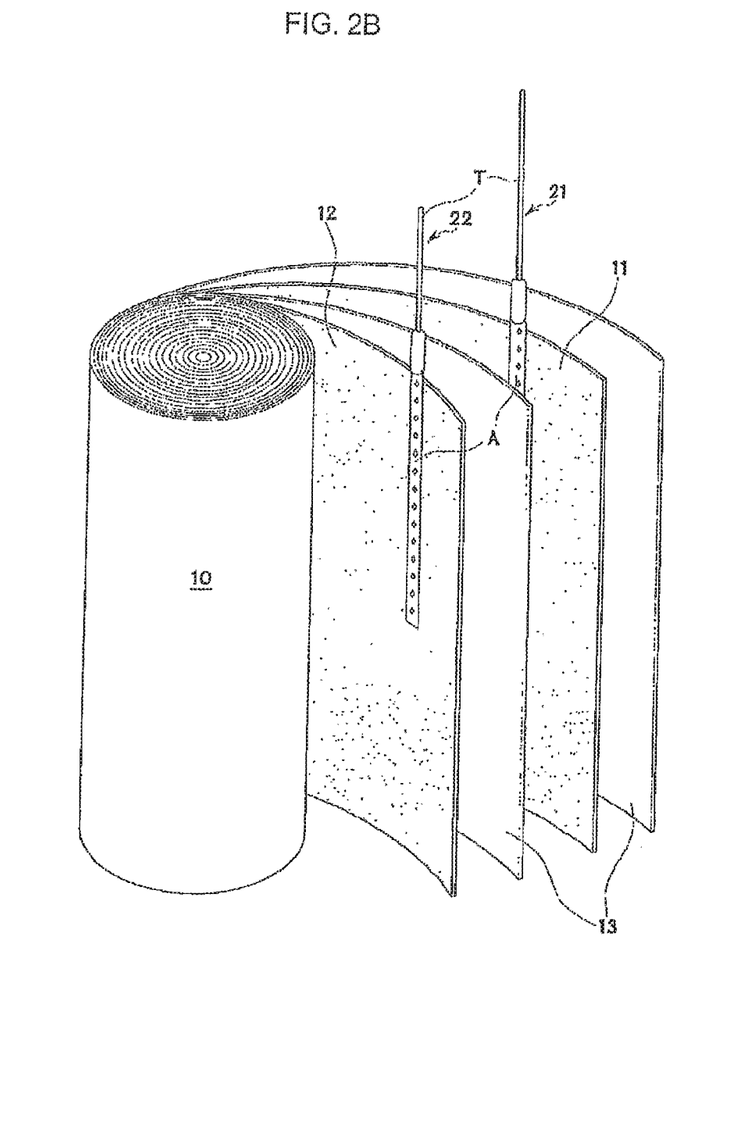
FIG. 2B is an exploded view of the electrode unit of FIG. 2A.

FIG. 1 depicts an energy storage device 100 according an embodiment. FIG. 2A is an exploded view of the energy storage device 100 of FIG. 1. FIG. 2B is an exploded view of the electrode unit of FIG. 2A. The energy storage device 100 can be an electric double layer device such as an EDLC or a ultra-capacitor. The energy storage device 100 includes an electrode unit 10, a first terminal 21, a second terminal 22, a case 30 and a flexible closure (or a bung) 40.

The electrode unit 10 includes a first current collection sheet 11, a second current collection sheet 12 and a separating sheet 13. The electrode unit 10 can be of a winding type where the first and second current collection sheets 11 and 12 are wound while being separated from each other by the separating sheet 13. The first and second terminals 21 and 22 are respectively connected to the first and second current collection sheets 11 and 12.

The first current collection sheet 11 and the second current collection sheet 12 may be used respectively as a positive electrode current collector and a negative electrode current collector. In this embodiment, the first terminal 21 is connected to the first current collection sheet 11 (used as a positive electrode current collector) and functions as a positive electrode terminal. Furthermore, the second terminal 22 is connected to the second current collection sheet 12 (used as a negative electrode current collector) and functions as a negative electrode terminal. Each of the first and second current collection sheets 11 and 12 may be made of aluminum foil on which an electrode active material is coated. The electrode active material may be conductive paste including mostly activated carbon. In some embodiments, as shown in FIGS. 2A and 2B, each of the first and second terminals 21 and 22 includes an aluminum terminal A. The aluminum terminal A may be anodized to form an aluminum oxide film thereon to prevent or minimize a wetting phenomenon.

The case 30 receives and accommodates the electrode unit 10. The flexible closure 40 covers a top portion of the case 30. The flexible closure 40 can be formed of a material that is flexible, elastic or pliant. For example, the flexible closure 40 is formed of a non-metal flexible material such as rubber or polymer. The flexible closure 40 can also be formed of a material whose microscopic structure can change based on different weight percentages of $SiO_2$. The flexible closure 40 includes therein a first through-hole 41 and a second through-hole 42, through which the first terminal 21 and the second terminal 22 respectively extend so as to be exposed to the environment.

The electrode unit 10 is impregnated with an electrolyte and is placed in the case 30. The upper end of the case 30, which faces the flexible closure 40, can be beaded and curled, whereby the flexible closure 40 is coupled to the case 30.

Figure 3A:
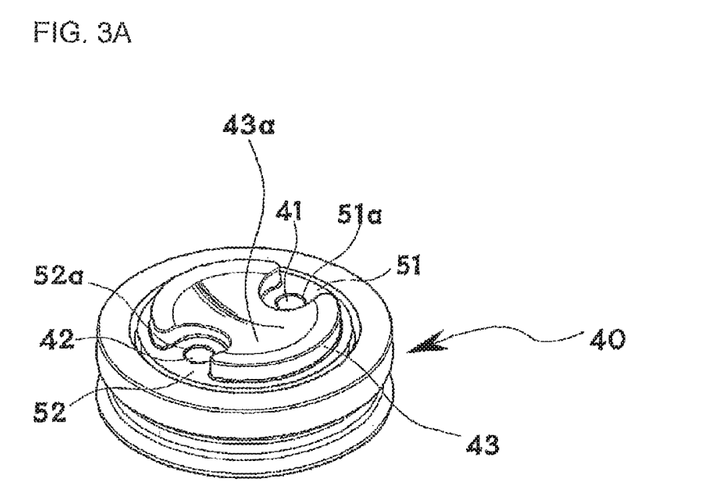
FIG. 3A is a perspective view of a flexible closure of the energy storage device of FIG. 1.
Figure 3B:
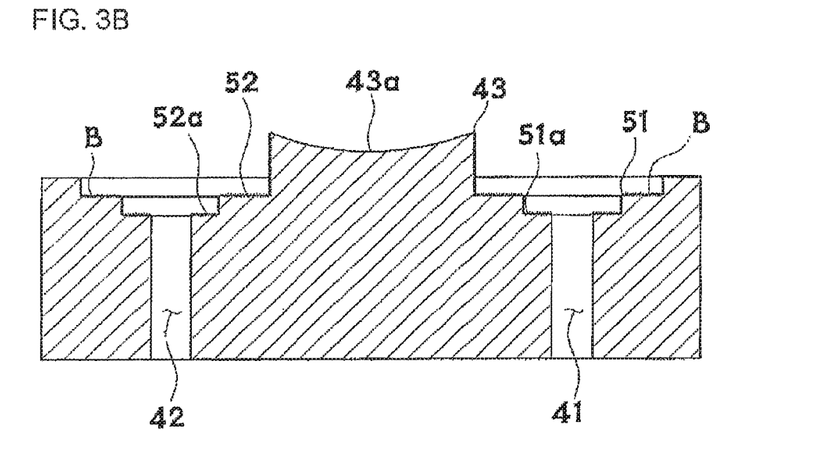
FIG. 3B is a cross-sectional view of the flexible closure of the energy storage device of FIG. 1.

FIG. 3A is a perspective view of a flexible closure of the energy storage device 100 of FIG. 1. FIG. 3B is a cross-sectional view of the flexible closure of the energy storage device 100 of FIG. 1.

In some embodiments, as shown in FIGS. 1-3B, the energy storage device 100 further includes a gap sealing portion 50. The gap sealing portion 50 seals the gap between the first terminal 22 and the first through-hole 41 and the gap between the second terminal 22 and the second through-hole 42. The gap sealing portion 50 can prevent or minimize the leakage of positive ions, whereby the lifespan of the energy storage device 100 can increase.

In some embodiments, the gap sealing portion 50 includes a first recess 51 and a second recess 52. The first and second recesses 51 and 52 are defined at least partially by a volume protrusion 43 of the flexible closure 40. The volume protrusion 43 is disposed around the first and second through-holes 41 and 42. The volume protrusion 43 protrudes upwardly such that the recesses 51 and 52 are lower in position than the volume protrusion 43. The gap sealing portion 50 includes a sealing material that is filled and hardened in the first and second recesses 51 and 52. The sealing material can be resin such as urethane resin. However, the sealing material can be other resin material or non-resin material that can be used to seal the gaps between the terminals 21 and 22 and the through-holes 41 and 42 described above.

In some embodiments, as shown in FIGS. 3A and 3B, the first recess 51 has a first pocket 51a recessed along the inner diameter of the first through-hole 41 such that the sealing material 53 fills the first pocket 51a and is hardened in tight physical contact with the first terminal 21. Similarly, the second recess 52 has a second pocket 52a recessed along the inner diameter of the second through-hole 42 such that the sealing material 53 fills the second pocket 52a and is hardened in tight physical contact with the second terminal 22. Thus, it is possible to further improve the sealing performance of the energy storage device 100 and prevent or minimize the leakage of positive ions through the gaps between the terminals 21 and 22 and the through-holes 41 and 42, whereby the lifespan of the energy storage device 100 further increases.

The volume protrusion 43 has a concave portion 43a, the height of which gradually decreases toward the center thereof such that the concave portion 43a becomes flat when the case 30 is beaded. This structure allows for the first and second terminals 21 and 22 to be stably loaded on a circuit board (not shown) when the terminals 21 and 22 are connected to the circuit board, even though the center of the volume protrusion 43 rises when the case 30 is beaded.

In some embodiments, as shown in FIG. 3B, each of the first and second recesses 51 and 52 includes an irregular portion B for increasing surface coupling force between each of the recesses 51 and 52 and the sealing material 53.

The irregular portion B may be formed by arc-discharging the surface of a mold at the time of molding the flexible closure 40 or by grinding the flexible closure 40 using a sand paper. Alternatively, the irregular portion B may be formed by mechanical etching, such as sand blasting, or by chemical etching.

Figure 4A:
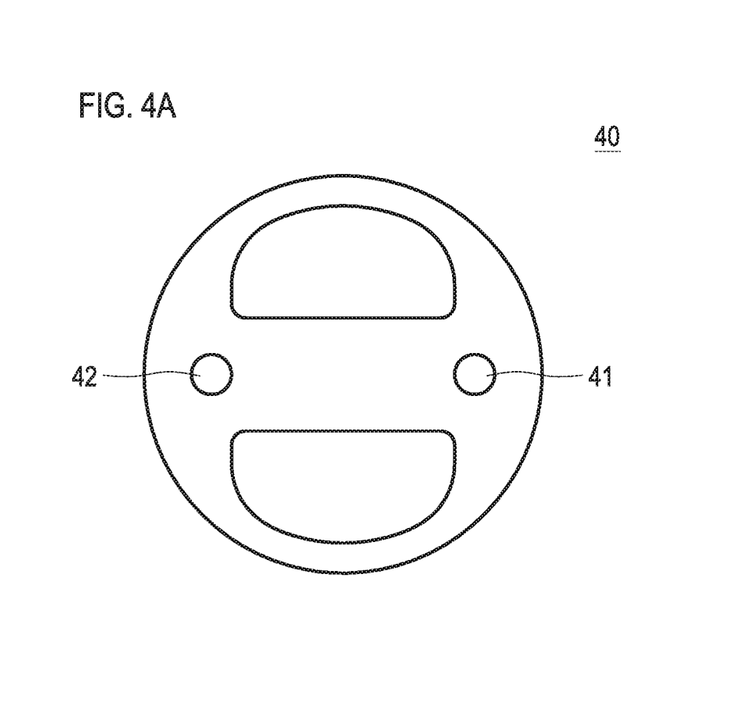
FIG. 4A is a plan view of a flexible closure of an energy storage device according to another embodiment.
Figure 4B:
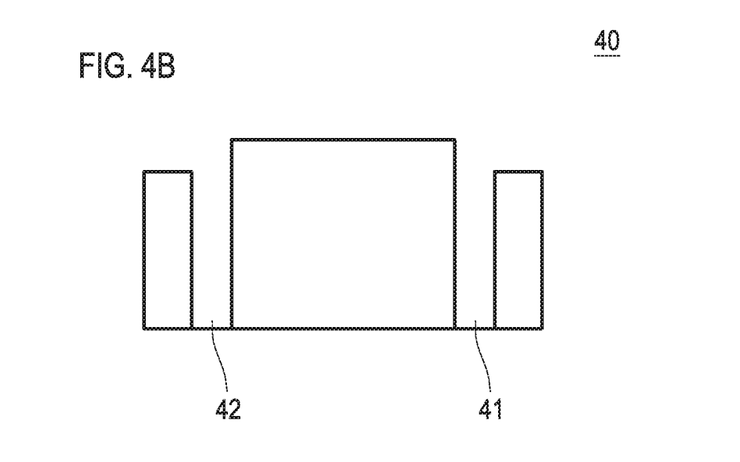
FIG. 4B is a cross-sectional view of the flexible closure of the energy storage device of FIG. 4A.

FIG. 4A is a plan view of a flexible closure of an energy storage device according to another embodiment. FIG. 4B is a cross-sectional view of the flexible closure of the energy storage device of FIG. 4A. In the embodiment shown in FIGS. 4A and 4B, the gap sealing portion 50 shown in FIGS. 3A and 3B is omitted in the flexible closure 40. In this embodiment, the terminals 21 and 22 merely pass through the through-holes 41 and 42 to be exposed to the environment without interacting with an additional through-hole sealing structure such as the elements 51-53 of the gas sealing portion 50 shown in FIGS. 3A and 3B.

Generally, a flexible closure of an electric double layer device contains a filler material such as $SiO_2$, $Al_2O_3$ and MgO. Table 1 below shows weight percentages of materials contained in a flexible closure of a typical electric double layer device (not necessarily prior art). The flexible closure may be made of rubber. Table 1 shows merely example weight percentages, and specific materials and/or their respective weight percentages can vary. For example, certain materials may be removed or other materials can be added depending on the electric double layer device.

TABLE 1

| Material | Weight percentage (wt %) |
| --- | --- |
| Polymer | 35% |
| Carbon | 13.5% |
| SiO2 | 28% |
| Al2O3 | 17% |
| ZnO | 1% |
| MgO | 0.5% |
| Resin | 4.5% |
| Others | 0.5% |

During operation of the electric double layer device, $SiO_2$ may be reduced to Si after losing $O_2$ at a negative potential, which will cause the flexible closure to structurally deform at a microscopic level. This can lead to the flexible closure leaking gas or electrolyte through its negative terminal (wetting phenomenon).

At least some of the disclosed embodiments significantly reduce a wetting phenomenon by lowering the weight percentage of $SiO_2$ in the filler material of a flexible closure. The weight percentage of $SiO_2$ may be reduced from 28 wt % to about 15 wt % or lower. The weight percentage of $SiO_2$ may be in the range of about 0 wt % to about 15 wt %. The range of about 0 wt % to about 15 wt % may include any range therein, for example, about 0 wt % to about 1 wt %, about 1 wt % to about 5 wt %, about 5 wt % to about 10 wt %, and about 10 wt % to about 15 wt %. The range of about 0 wt % to about 1 wt % may include any range therein, for example, about 0 wt % to about 0.1 wt %, about 0.1 wt % to about 0.25 wt %, about 0.25 wt % to about 0.5 wt %, about 0.5 wt % to about 0.75 wt %, about 0.75 wt % to about 1 wt %, 0 wt % to about 0.5 wt %, about 0.5 wt % to about 1 wt %, about 0.6 wt % to about 0.7 wt %, etc. The weight percentage of $SiO_2$ may be greater than or equal to 0 wt % and less than 28 wt %. The weight percentage of $SiO_2$ may also be one particular weight percentage within any of the above-described ranges, for example, about 0.1 wt %, about 0.5 wt %, about 0.7 wt %, about 1 wt %, about 5 wt %, about 10 wt %, about 15 wt %, etc.

In some embodiments, in addition to or independently of reducing the weight percentage of $SiO_2$, the weight percentage of ZnO is reduced to be less than 1 wt %. For example, the weight percentage of ZnO is greater than or equal to wt % and less than 1 wt %. Similar to the weight percentage of $SiO_2$ described above, the range of about 0 wt % to 1 wt % of ZnO may include any range therein, for example, about 0 wt % to about 0.1 wt %, about 0.1 wt % to about 0.25 wt %, about 0.25 wt % to about 0.5 wt %, about 0.5 wt % to about 0.75 wt %, about 0.75 wt % to 1 wt %, 0 wt % to about 0.5 wt %, about 0.5 wt % to about 1 wt %, about 0.6 wt % to about 0.7 wt %, etc. The weight percentage of ZnO may also be one particular weight percentage within any of the ranges described above, for example, about 0.1 wt %, about 0.25 wt %, about 0.5 wt %, about 0.75 wt %, about 0.9 wt %, etc.

According to various embodiments, since the weight percentage of $SiO_2$ is significantly reduced and thus, the amount and degree of the $SiO_2$ reduction significantly decreases, even if $SiO_2$ is reduced to Si at a negative potential, a structural deformation of the flexible closure at a microscopic level is minimized. Accordingly, a wetting phenomenon is significantly reduced, and thus the life span of an energy storage device significantly increases.

Multiple experiments will be discussed below. A skilled person would appreciate that the experiments described herein are merely examples and are not intended to limit the scope of protection. For example, the experiments below use multiple testing parameters such as voltage, temperature, relative humidity (RH), capacitance, the number of tested devices, type of rubber, type of polymer, ratio of different polymers (e.g., a 100% first type of polymer v. a 80% first type of polymer and a 20% second different type of polymer), existence of a gap sealing portion, testing hours, etc. The specific values of these parameters may change, some of the parameters may be removed, or other parameters may be added. For example, one or more of the existence of carbon, the thicknesses of coating of the positive and negative current collection sheets, type of electrolyte, the winding structure of the electrode unit may also be added.

In some embodiments, when the weight percentage of $SiO_2$ decreases below 28 wt %, the weight percentages of all of the remaining materials shown in Table 1 are proportionally or randomly increased or adjusted. In other embodiments, the weight percentage of at least one of the remaining materials is increased as much weight percentage as the reduced weight percentage of $SiO_2$, and the weight percentages of the other materials remain the same. For example, when the weight percentage of $SiO_2$ is reduced from 28 wt % to 10 wt % (8 wt % decrease), the weight percentages of all of the remaining materials may be proportionally increased. That is, the weight percentage of polymer (35 wt %) is increased by 7 wt % ((18/90)×35 wt %=7 wt %), the weight percentage of carbon (13.5 wt %) is increased by 2.7 wt % ((18/90)×13.5 wt %=2.7 wt %), the weight percentage of $Al_2O_3$ (17 wt %) is increased by 3.4 wt % ((18/90)×17 wt %=3.4 wt %), etc. As another example, when the weight percentage of $SiO_2$ is reduced from 28 wt % to 15 wt % (13 wt % decrease), the weight percentage of polymer (35 wt %) may be increased by 13 wt % to 48 wt %, and the weight percentages of the other materials may remain the same. Other weight percentage adjustments of one or more of the non-$SiO_2$ materials may also be possible. As long as the weight percentage of $SiO_2$ is reduced, the wetting phenomenon is significantly reduced, regardless of how the weight percentages of the non-$SiO_2$ materials are adjusted.

Experiment 1 (without a Gap Sealing Portion)

Table 2 shows Experiment 1 where the gap sealing portion 50 was not included in the flexible closure of an electric double layer device (e.g., see FIGS. 4A and 4B). Experiment 1 was performed with the following parameters: voltage/capacitance (2.7V/10F), temperature (65° C.), relative humidity (90%), and the total number of electric double layer devices tested (10). The rubber model used for the flexible closure 40 includes Types A-D which may respectively include IIR-SR, SRD7-605, SRD7-225 and SRD7-606. Here, IIR stands for Butyl rubber (Isobutylene-isoprene rubber). These rubber models are merely examples and other types of rubber can also be used. The polymer ratio used for the flexible closure 40 includes Ratios A-C. Ratio A may be a 100% first type of polymer. Ratio B may be the combination of a 80% first type of polymer and a 20% second different type of polymer. Ratio C may be the combination of a 50% first type of polymer and a 50% second different type of polymer. Again, these polymer ratios are merely examples and other ratios can also be used.

TABLE 2

| | Rubber model | Polymer ratio | $SiO_2$ % | 500 h | 1000 h | 1500 h | 2000 h | 2500 h | 3000 h |
|---|---|---|---|---|---|---|---|---|---|
| 1 | Type A | Ratio A | 28% | 60% (6) | 90% (9) | 100% (10) | | | |
| 2 | Type B | Ratio B | <1% | 0% | 0% | 0% | 0% | 20% (2) | 30% (3) |
| 3 | Type C | Ratio A | <1% | 0% | 0% | 0% | 0% | 20% (2) | 30% (3) |
| 4 | Type D | Ratio C | <1% | 0% | 0% | 0% | 0% | 30% (3) | 40% (4) |

Test example 1 is a comparative example where a flexible closure of an electric double layer device having 28 wt % of $SiO_2$, a type A rubber model and a polymer having ratio A were used. The weight percentages of the non-$SiO_2$ materials may be or may not be the same as in Table 1 as discussed above. As shown in Table 1, under the Test example 1 conditions, 6 out of the 10 tested devices (60%) were wet in 500 hours, 9 out of the 10 tested devices (90%) were wet in 1,000 hours and all 10 tested devices (100%) were wet in 1,500 hours.

In Test example 2, the weight percentage of $SiO_2$ is less than 1 wt %, and a type B rubber model and a polymer having ratio B were used. As shown in Table 2, under the Test example 2 conditions, none of the 10 tested devices were wet up to 2,000 hours. Furthermore, only 2 of the 10 tested devices were wet in 2,500 hours and only 3 of the 10 tested devices were wet in 3,000 hours. The same test results were obtained in Test example 3 where a type C rubber and a polymer having ratio A (different from Test example 2) were used. Similar results were obtained in Test example 4 where a type D rubber and a polymer having ratio C (different from Test examples 2 and 3) were used. That is, in Test example 4, none of the 10 tested devices were wet up to 2,000 hours, only 3 of the 10 tested devices were wet in 2,500 hours and only 4 of the 10 tested devices were wet in 3,000 hours.

In summary, a wetting phenomenon occurred in 500 hours in a typical electric double layer device (Test example 1), whereas a wetting phenomenon occurred in 2,500 hours in an electric double layer device according to embodiments (Test examples 2-4). Furthermore, 60% of the Test example 1 devices were wet in 500 hours, whereas only 20% of the Test example 2-3 devices were wet in 2,500 hours and only 30% of the Test example 4 device were wet in 2,500 hours. That is, embodiments shown in Test examples 2-4 have a life term that is significantly longer than that of Test example 1. Moreover, when the weight percentage of $SiO_2$ is less than 1 wt %, differences in the type of rubber model or polymer ratio are almost irrelevant to the test results.

Experiment 2 (without a Gap Sealing Portion)

Table 3 shows Experiment 2 where the gap sealing portion 50 was not included in the flexible closure (e.g., see FIGS. 4A and 4B). Experiment 2 was performed with the following parameters: voltage/capacitance (2.7V/OF), temperature (65° C.), relative humidity (90%), the total number of electric double layer devices tested (10) and the same type of polymer. The rubber model used for the flexible closure 40 includes Types A and B which may respectively include IIR-SR and SRD7-225. Again, these rubber models are merely examples and other types of rubber can also be used.

TABLE 3

| | Rubber model | $SiO_2$ % | 500 h | 1000 h | 1500 h | 2000 h | 2500 h | 3000 h |
|---|---|---|---|---|---|---|---|---|
| 1 | Type A | 28% | 60% (6) | 90% (9) | 100% (10) | | | |
| 2 | Type B | <1% | 0% | 0% | 0% | 0% | 20% (2) | 30% (3) |
| 3 | Type B | 5% | 0% | 0% | 10% (1) | 20% (2) | 40% (4) | 50% (5) |
| 4 | Type B | 10% | 0% | 10% (1) | 10% (1) | 30% (3) | 60% (6) | 80% (8) |
| 5 | Type B | 15% | 10% (1) | 30% (3) | 40% (4) | 60% (6) | 90% (9) | 90% (9) |

Test example 1 is a comparative example where a flexible closure of an electric double layer device having 28 wt % of $SiO_2$ and a type A rubber model were used. As shown in Table 1, under the Test example 1 conditions, 6 out of the 10 tested devices (60%) were wet in 500 hours, 9 out of the 10 tested devices (90%) were wet in 1,000 hours and all 10 tested devices (100%) were wet in 1,500 hours. This result is the same as Test example 1 of Experiment 1.

In Test example 2, the weight percentage of $SiO_2$ is less than 1 wt % and a type B rubber model was used. As shown in Table 3, under the Test example 2 conditions, none of the 10 tested devices were wet up to 2,000 hours. Furthermore, only 2 of the 10 tested devices were wet in 2,500 hours and only 3 of the 10 tested devices were wet in 3,000 hours.

In Test example 3, the weight percentage of $SiO_2$ is wt % and a type B rubber model was used. As shown in Table 3, under the Test example 3 conditions, none of the 10 tested devices were wet up to 1,000 hours. Furthermore, only 1 of the 10 tested devices was wet in 1,500 hours and only 2 of the 10 tested devices were wet in 2,000 hours. Moreover, only 4 of the 10 tested devices were wet in 2,500 hours and only 5 of the 10 tested devices were wet in 3,000 hours.

In Test example 4, the weight percentage of $SiO_2$ is 10 wt % and a type B rubber model was used. As shown in Table 3, under the Test example 4 conditions, none of the 10 tested devices were wet up to 500 hours. Furthermore, only 1 of the 10 tested devices was wet in 1,000 hours and 1,500 hours, and only 3 of the 10 tested devices were wet in 2,000 hours.

In Test example 5, the weight percentage of $SiO_2$ is 15 wt % and a type B rubber model was used. As shown in Table 3, under the Test example 5 conditions, only 1 of the 10 tested devices was wet in 500 hours. Furthermore, only 3 of the 10 tested devices were wet in 1,000 hours and only 4 of the 10 tested devices were wet in 1,500 hours.

In summary, a wetting phenomenon occurred in 500 hours in a typical electric double layer device (Test example 1), whereas a wetting phenomenon occurred in 2,500 hours in an electric double layer device according to embodiments (Test example 2). Furthermore, all of the Test example 1 devices were wet in 1,500 hours, whereas only 10% of the Test example 3-4 devices were wet in 1,500 hours and only 40% of the Test example 5 device were wet in 1,500 hours. That is, embodiments shown in Test examples 2-5 have a life term that is significantly longer than that of Test example 1.

Experiment 3 (with and without a Gap Sealing Portion)

Table 4 shows Experiment 3 where the gap sealing portion 50 was used in Test example 2 (e.g., see FIGS. 3A and 3B) but not used in Test examples 1 and 3 (e.g., see FIGS. 4A and 4B). Experiment 3 was performed with the following parameters: voltage/capacitance (3.0V/3F), temperature (65° C.), relative humidity (90%), the total number of sample devices tested (15 and 20) and the same type of polymer. The rubber model used for the flexible closure 40 includes Types A and B which may respectively include IIR-SR and SRD7-225. Again, these rubber models are merely examples and other types of rubber can be used.

TABLE 4

|   | Rubber Model | Gap sealing | $SiO_2$ % | Qty | 500 h | 1000 h | 1500 h | 2000 h |
|---|---|---|---|---|---|---|---|---|
| 1 | Type A | No | 28% | 15 | 53% (8) | 80% (12) | 93% (14) |   |
| 2 | Type A | Yes | 28% | 20 | 0% | 0% | 25% (5) | 45% (9) |
| 3 | Type B | No | <1% | 20 | 0% | 0% | 0% | 10% (2) |

Test example 1 is a comparative example where a flexible closure of an electric double layer device having 28 wt % of $SiO_2$ and a type A rubber model were used, and the gap sealing portion 50 was not used. As shown in Table 4, under the Test example 1 conditions, 8 out of the 15 tested devices (53%) were wet in 500 hours, 12 out of the 15 tested devices (80%) were wet in 1,000 hours and 14 of the 15 tested devices (93%) were wet in 1,500 hours.

In Test example 2, the weight percentage of $SiO_2$ is 28 wt %, a type A rubber model was used, and the gap sealing portion 50 was used. As shown in Table 4, under the Test example 2 conditions, none of the 20 tested devices were wet up to 1,000 hours. Furthermore, only 5 of the 20 tested devices (25%) were wet in 1,500 hours and only 9 of the 20 tested devices (45%) were wet in 2,000 hours.

In Test example 3, the weight percentage of $SiO_2$ is less than 1 wt %, a type B rubber model was used, and the gap sealing portion 50 was not used. As shown in Table 4, under the Test example 3 conditions, none of the 10 tested devices were wet up to 1,500 hours. Furthermore, only 2 of the 20 tested devices (10%) were wet in 2,000 hours.

In summary, a wetting phenomenon occurred in 500 hours in an electric double layer device having a flexible closure that contains 28 wt % of $SiO_2$ (Test example 1), whereas a wetting phenomenon occurred in 2,000 hours in an electric double layer device having a flexible closure that contains less than 1 wt % of $SiO_2$ (Test example 3). Furthermore, when the gap sealing portion 50 was used, a wetting phenomenon occurred in 1,500 hours, even though the flexible closure 40 contains 28 wt % of $SiO_2$ (Test example 2). That is, embodiments shown in Test examples 2 and 3 have a life term that is significantly longer than that of Test example 1.

The materials and methods provided herein can be implemented in various energy storage devices. As provided herein, an energy storage device can be a capacitor, a lithium ion capacitor (LIC), an EDLC, an ultra-capacitor, a battery, or a hybrid energy storage device combining aspects of two or more of the foregoing. In certain embodiments, the device is a battery.

An energy storage device as provided herein can be of any suitable configuration, for example planar, spirally wound, button shaped, or pouch. An energy storage device as provided herein can be a component of a system, for example, a power generation system, an uninterruptible power source systems (UPS), a photo voltaic power generation system, an energy recovery system for use in, for example, industrial machinery and/or transportation. An energy storage device as provided herein may be used to power various electronic device and/or motor vehicles, including hybrid electric vehicles (HEV), plug-in hybrid electric vehicles (PHEV), and/or electric vehicles (EV).

As used herein, the terms "battery" and "capacitor" are to be given their ordinary and customary meanings to a person of ordinary skill in the art. The terms "battery" and "capacitor" are nonexclusive of each other. A capacitor or battery can refer to a single electrochemical cell that may be operated alone, or operated as a component of a multi-cell system.

As used herein, the voltage of an energy storage device is the operating voltage for a single battery or capacitor cell. Voltage may exceed the rated voltage or be below the rated voltage under load, or according to manufacturing tolerances.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y. and Z" unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result.

The scope of the present disclosure is not intended to be limited by the specific disclosures of embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

What is claimed is:

1. An energy storage device, comprising:
an electrode unit including first and second current collectors that are separated by a separator;
first and second terminals respectively connected to the first and second current collectors;
a case accommodating the electrode unit, the case having an opening into which the electrode unit is configured to be inserted; and
a flexible closure covering the opening of the case and having first and second through-holes passing therethrough and exposing the first and second terminals to the environment, wherein the flexible closure contains polymer, carbon, $Al_2O_3$, resin, and about 15 wt % or less of $SiO_2$.

2. The energy storage device of claim 1, wherein the flexible closure contains about 10 wt % or less of $SiO_2$.

3. The energy storage device of claim 1, wherein the flexible closure contains about 5 wt % or less of $SiO_2$.

4. The energy storage device of claim 1, wherein the flexible closure contains about 1 wt % or less of $SiO_2$.

5. The energy storage device of claim 1, wherein the weight percentage of $SiO_2$ is greater than or equal to 0 wt % and less than 1 wt %.

6. The energy storage device of claim 1, wherein the flexible closure contains ZnO whose weight percentage is less than 1 wt %.

7. The energy storage device of claim 1, wherein the flexible closure is formed of rubber.

8. The energy storage device of claim 1, wherein the energy storage device is configured to operate for at least 3,000 hours at a voltage of 2.7 to 3V, a temperature of 65° C. and a relative humidity of 90%.

9. The energy storage device of claim 1, further comprising a resin material formed in a gap between the first through-hole and the first terminal and between the second through-hole and the second terminal, the gap being exposed to the environment.

10. The energy storage device of claim 9, wherein the resin material comprises a urethane resin.

11. The energy storage device of claim 1, wherein the polymer has a weight percentage greater than 35 wt %, the carbon has a weigh weight percentage greater than 13.5 wt %, the $Al_2O_3$ has a weigh weight percentage greater than 17 wt %, and the resin has a weight percentage greater than 4.5 wt %.

12. The energy storage device of claim 1, wherein the flexible closure further contains first and second types of polymer different from each other.

13. The energy storage device of claim 12, wherein the first and second types of polymer have different weight percentages.

14. The energy storage device of claim 12, wherein the first and second types of polymer have the same weight percentage.

15. An energy storage device, comprising:
an electrode unit including first and second current collectors that are separated by a separator;
first and second terminals respectively connected to the first and second current collectors;
a case accommodating the electrode unit, the case having an opening into which the electrode unit is configured to be inserted; and
a flexible closure covering the opening of the case and having first and second through-holes passing therethrough and exposing the first and second terminals to the environment,
wherein the flexible closure contains about 15 wt % or less of $SiO_2$ and 1 wt % or less of ZnO, and wherein the flexible closure further contains at least one of the following: polymer having a weight percentage greater than 35 wt %, carbon having a weight percentage greater than 13.5 wt %, $Al_2O_3$ having a weight percentage greater than 17 wt % or and resin having a weight percentage greater than 4.5 wt %.

16. The energy storage device of claim 15, wherein the flexible closure contains about 10 wt % or less of $SiO_2$.

17. The energy storage device of claim 15, wherein the flexible closure contains about 5 wt % or less of $SiO_2$.

18. The energy storage device of claim 15, wherein the flexible closure contains about 1 wt % or less of $SiO_2$.

19. An energy storage device, comprising:
an electrode unit including first and second current collectors that are separated by a separator;
first and second terminals respectively connected to the first and second current collectors;
a case accommodating the electrode unit; and
a flexible closure covering the case and having first and second through-holes passing therethrough and exposing the first and second terminals to the environment, wherein the flexible closure contains $SiO_2$ in the range of being greater than 0 wt % and less than 28 wt %.

20. The energy storage device of claim 19, wherein the weight percentage of $SiO_2$ is less than about 15 wt %.

21. An energy storage device, comprising:
an electrode unit including first and second current collectors that are separated by a separator;
first and second terminals respectively connected to the first and second current collectors;
a case accommodating the electrode unit, the case having an opening into which the electrode unit is configured to be inserted; and
a flexible closure covering the opening of the case and having first and second through-holes passing therethrough and exposing the first and second terminals to the environment, wherein the flexible closure contains $SiO_2$ in the range of 0 wt % and less than 28 wt %, and wherein the flexible closure further contains at least one of the following: polymer having a weight percentage greater than 35 wt %, carbon having a weight percentage greater than 13.5 wt %, $Al_2O_3$ having a weight percentage greater than 17 wt %, or resin having a weight percentage greater than 4.5 wt %.

22. An energy storage device, comprising:
an electrode unit including first and second current collectors that are separated by a separator;
first and second terminals respectively connected to the first and second current collectors;
a case accommodating the electrode unit, the case having an opening into which the electrode unit is configured to be inserted; and
a flexible closure covering the opening of the case and having first and second through-holes passing therethrough and exposing the first and second terminals to the environment, wherein the flexible closure contains polymer, carbon, $Al_2O_3$, resin, and $SiO_2$ in the range of 0 wt % and less than 28 wt %.

23. The energy storage device of claim 22, wherein the polymer has a weight percentage greater than 35 wt %, the carbon has a weight percentage greater than 13.5 wt %, the $Al_2O_3$ has a weight percentage greater than 17 wt %, and the resin has a weight percentage greater than 4.5 wt %.

24. The energy storage device of claim 1, wherein the flexible closure comprises a bottom surface facing the electrode unit and a top surface opposing the bottom surface, and wherein the top surface of the flexible closure is exposed to the environment.

25. The energy storage device of claim 1, wherein the flexible closure is configured to minimize a structural deformation at a microscopic level therein to significantly reduce a wetting phenomenon in the energy storage device.

* * * * *